US010925037B2

United States Patent
Gao et al.

(10) Patent No.: US 10,925,037 B2
(45) Date of Patent: Feb. 16, 2021

(54) WIRELESS COMMUNICATION METHOD, ENODEB, AND USER EQUIPMENT

(71) Applicant: Sun Patent Trust, New York, NY (US)

(72) Inventors: Chi Gao, Beijing (CN); Hidetoshi Suzuki, Kanagawa (JP); Li Wang, Beijing (CN); Masayuki Hoshino, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 973 days.

(21) Appl. No.: 15/104,202

(22) PCT Filed: Jan. 27, 2014

(86) PCT No.: PCT/CN2014/071597
§ 371 (c)(1),
(2) Date: Jun. 13, 2016

(87) PCT Pub. No.: WO2015/109607
PCT Pub. Date: Jul. 30, 2015

(65) Prior Publication Data
US 2016/0330723 A1     Nov. 10, 2016

(51) Int. Cl.
*H04W 72/04*         (2009.01)
*H04B 7/26*          (2006.01)
(Continued)

(52) U.S. Cl.
CPC .......... *H04W 72/0406* (2013.01); *H04B 7/26* (2013.01); *H04L 5/0053* (2013.01);
(Continued)

(58) Field of Classification Search
CPC ......... H04W 72/0406; H04W 72/0446; H04W 4/70; H04L 5/0053; H04L 5/0032; H04B 7/26
See application file for complete search history.

(56) References Cited

U.S. PATENT DOCUMENTS

2012/0307755 A1* 12/2012 Kim ................ H04L 1/1825
                                                    370/329
2013/0121317 A1   5/2013 Lee et al.
(Continued)

FOREIGN PATENT DOCUMENTS

WO     2013/015194 A1    1/2013

OTHER PUBLICATIONS

MediaTek, "Discussion on (E)PDCCH coverage enhancement", RI-135425, Nov. 11-15, 2013. (Year: 2013).*
(Continued)

*Primary Examiner* — Andrew Lai
*Assistant Examiner* — Chuong M Nguyen
(74) *Attorney, Agent, or Firm* — Seed IP Law Group LLP

(57) ABSTRACT

The present disclosure provides a wireless communication method and an eNode B and user equipment therefor. The method comprises a step of transmitting multiple PDCCH or EPDCCH repetitions respectively in multiple successive downlink subframes with a transmission repetition number and a transmission starting subframe. The transmission starting subframe is selected from a first starting subframe set corresponding to the first repetition number or a second starting subframe set corresponding to the second repetition number. The subframe indexes of any two adjacent starting subframes in the first starting subframe set are offset by a same first index interval, the subframe indexes of any two adjacent starting subframes in the second starting subframe set are offset by a same second index interval, and the second index interval is an integral multiple of the first index interval. According to the present disclosure, the resource blocking probability of different repetition numbers, UE's detection complexity can be decreased, and eNB's scheduling complexity.

14 Claims, 5 Drawing Sheets

(51) Int. Cl.
*H04L 5/00* (2006.01)
*H04W 4/70* (2018.01)

(52) U.S. Cl.
CPC ....... *H04W 72/0446* (2013.01); *H04L 5/0032* (2013.01); *H04W 4/70* (2018.02)

(56) References Cited

U.S. PATENT DOCUMENTS

| | | | |
|---|---|---|---|
| 2013/0272258 A1* | 10/2013 | Lee .................... | H04W 72/0413 370/329 |
| 2014/0098761 A1* | 4/2014 | Lee ....................... | H04W 24/02 370/329 |
| 2014/0153532 A1 | 6/2014 | Nogami et al. | |
| 2015/0181576 A1* | 6/2015 | Papasakellariou ........ | H04L 1/08 370/329 |
| 2015/0245323 A1* | 8/2015 | You ..................... | H04W 72/042 370/329 |
| 2016/0234700 A1* | 8/2016 | Wong .................... | H04L 5/0053 |
| 2016/0278054 A1* | 9/2016 | You ........................ | H04W 4/70 |

OTHER PUBLICATIONS

Extended European Search Report, dated Nov. 7, 2016, for corresponding EP Application No. 14879322.7-1851, 7 pages.
LG Electronics, "PDCCH transmission for MTC coverage enhancement," R1-135461, 3GPP TSG RAN WG1 Meeting #75, Agenda Item: 6.2.2.2.3, San Francisco, USA, Nov. 11-15, 2013, 5 pages.
ZTE, "Discussion on Control Channel Coverage Improvement," R1-135360, 3GPP TSG RAN WG1 Meeting #75, Agenda Item: 6.2.2.2.3, San Francisco, USA, Nov. 11-15, 2013, 6 pages.
International Search Report dated Oct. 27, 2014, for corresponding International Application No. PCT/CN 2014/071597, 2 pages.
MediaTek Inc., "Analysis of (E)PDCCH enhancements and timing relationship with PDSCH," R1-134444, 3GPP TSG-RAN WG1 #74b, Agenda Item: 7.2.2.2.4, Guangzhou, P.R. China, Oct. 7-11, 2013, 4 pages.
MediaTek Inc., "Discussion on (E)PDCCH coverage enhancement," R1-135425, 3GPP TSG-RAN WG1 #75, Agenda Item: 6.2.2.2.3, San Francisco, USA, Nov. 11-15, 2013, 6 pages.
Indian Examination Report dated Jul. 28, 2020, for the Corresponding Indian Patent Application No. 201627022727, 7 pages.

* cited by examiner

200

| Transmitting multiple PDCCH or EPDCCH repetitions respectively in multiple successive downlink subframes with a transmission repetition number and a transmission starting subframe | 201 |

500

Detecting multiple PDCCH or EPDCCH repetitions transmitted respectively in multiple successive downlink subframes from the eNode B with a transmission repetition number and a transmission starting subframe  501

WIRELESS COMMUNICATION METHOD, ENODEB, AND USER EQUIPMENT

TECHNICAL FIELD

The present disclosure relates to the field of wireless communication, and in particular, to a wireless communication method for communicating Physical Downlink Control Channel (PDCCH) or Enhanced PDCCH (EPDCCH), and an eNode B (eNB) and user equipment (UE) therefor.

BACKGROUND

Machine-Type Communication (MTC) is an important revenue stream for operators and has a huge potential from the operator's perspective. Based on the market and operators' requirements, there are two requirements for MTC operation in LTE (Long Term Evolution). One is low-cost of MTC UEs and communication; another is improving the coverage of MTC UEs. To enhance the MTC coverage, almost each of the physical channels need to be enhanced including (E)PDCCH (PDCCH or EPDCCH). For (E)PDCCH, repetition in time domain is the main method to improve the coverage. Based on simulation results presented in 3GPP (The 3rd Generation Partnership Project) meeting, hundreds of repetitions are needed for (E)PDCCH transmission.

SUMMARY OF THE DISCLOSURE

In view of the above, the present disclosure provides a wireless communication method for communicating PDCCH or EPDCCH repetition, and an eNB and UE therefor.

In a first aspect of the present disclosure, there is provided a wireless communication method performed by an eNode B for transmitting Physical Downlink Control Channel (PDCCH) or Enhanced PDCCH (EPDCCH), comprising a step of transmitting multiple PDCCH or EPDCCH repetitions respectively in multiple successive downlink subframes with a transmission repetition number and a transmission starting subframe. The transmission repetition number is selected from a repetition number set which is composed of at least a first repetition number and a second repetition number larger than the first repetition number. The transmission starting subframe is selected from a first starting subframe set corresponding to the first repetition number when the first repetition number is selected as the transmission repetition number, and the transmission starting subframe is selected from a second starting subframe set corresponding to the second repetition number when the second repetition number is selected as the transmission repetition number. The subframe indexes of any two adjacent starting subframes in the first starting subframe set are offset by a same first index interval, the subframe indexes of any two adjacent starting subframes in the second starting subframe set are offset by a same second index interval, the second index interval is an integral multiple of the first index interval, the subframe index of at least one subframe in the first starting subframe set is identical to the subframe index of one subframe in the second starting subframe set, the number of downlink subframes from any starting subframe until its next starting subframe in the first starting subframe set is not smaller than the first repetition number, and the number of downlink subframes from any starting subframe until its next starting subframe in the second starting subframe set is not smaller than the second repetition number.

In a second aspect of the present disclosure, there is provided a wireless communication method performed by a user equipment (UE) for detecting Physical Downlink Control Channel (PDCCH) or Enhanced PDCCH (EPDCCH) transmitted from an eNode B, comprising a step of detecting multiple PDCCH or EPDCCH repetitions transmitted respectively in multiple successive downlink subframes from the eNode B with a transmission repetition number and a transmission starting subframe. The transmission repetition number is selected from a repetition number set which is composed of at least a first repetition number and a second repetition number larger than the first repetition number. The transmission starting subframe is selected from a first starting subframe set corresponding to the first repetition number when the first repetition number is selected as the transmission repetition number, and the transmission starting subframe is selected from a second starting subframe set corresponding to the second repetition number when the second repetition number is selected as the transmission repetition number. The subframe indexes of any two adjacent starting subframes in the first starting subframe set are offset by a same first index interval, the subframe indexes of any two adjacent starting subframes in the second starting subframe set are offset by a same second index interval, the second index interval is an integral multiple of the first index interval, the subframe index of at least one subframe in the first starting subframe set is identical to the subframe index of one subframe in the second starting subframe set, the number of downlink subframes from any starting subframe until its next starting subframe in the first starting subframe set is not smaller than the first repetition number, and the number of downlink subframes from any starting subframe until its next starting subframe in the second starting subframe set is not smaller than the second repetition number.

In a third aspect of the present disclosure, there is provided an eNode B for transmitting Physical Downlink Control Channel (PDCCH) or Enhanced PDCCH (EPDCCH), comprising a transmitting unit configured to transmit multiple PDCCH or EPDCCH repetitions respectively in multiple successive downlink subframes with a transmission repetition number and a transmission starting subframe. The transmission repetition number is selected from a repetition number set which is composed of at least a first repetition number and a second repetition number larger than the first repetition number. The transmission starting subframe is selected from a first starting subframe set corresponding to the first repetition number when the first repetition number is selected as the transmission repetition number, and the transmission starting subframe is selected from a second starting subframe set corresponding to the second repetition number when the second repetition number is selected as the transmission repetition number. The subframe indexes of any two adjacent starting subframes in the first starting subframe set are offset by a same first index interval, the subframe indexes of any two adjacent starting subframes in the second starting subframe set are offset by a same second index interval, the second index interval is an integral multiple of the first index interval, the subframe index of at least one subframe in the first starting subframe set is identical to the subframe index of one subframe in the second starting subframe set, the number of downlink subframes from any starting subframe until its next starting subframe in the first starting subframe set is not smaller than the first repetition number, and the number of downlink subframes from any starting subframe until its next starting subframe in the second starting subframe set is not smaller than the second repetition number.

In a fourth aspect of the present disclosure, there is provided a user equipment (UE) for detecting Physical Downlink Control Channel (PDCCH) or Enhanced PDCCH (EPDCCH) transmitted from an eNode B, comprising a detecting unit configured to detect multiple PDCCH or EPDCCH repetitions transmitted respectively in multiple successive downlink subframes from the eNode B with a transmission repetition number and a transmission starting subframe. The transmission repetition number is selected from a repetition number set which is composed of at least a first repetition number and a second repetition number larger than the first repetition number. The transmission starting subframe is selected from a first starting subframe set corresponding to the first repetition number when the first repetition number is selected as the transmission repetition number, and the transmission starting subframe is selected from a second starting subframe set corresponding to the second repetition number when the second repetition number is selected as the transmission repetition number. The subframe indexes of any two adjacent starting subframes in the first starting subframe set are offset by a same first index interval, the subframe indexes of any two adjacent starting subframes in the second starting subframe set are offset by a same second index interval, the second index interval is an integral multiple of the first index interval, the subframe index of at least one subframe in the first starting subframe set is identical to the subframe index of one subframe in the second starting subframe set, the number of downlink subframes from any starting subframe until its next starting subframe in the first starting subframe set is not smaller than the first repetition number, and the number of downlink subframes from any starting subframe until its next starting subframe in the second starting subframe set is not smaller than the second repetition number.

According to the above aspects of the present invention, the resource blocking probability of different repetition numbers, UE's detection complexity, and eNB's scheduling complexity can be decreased.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figures 1, 2:
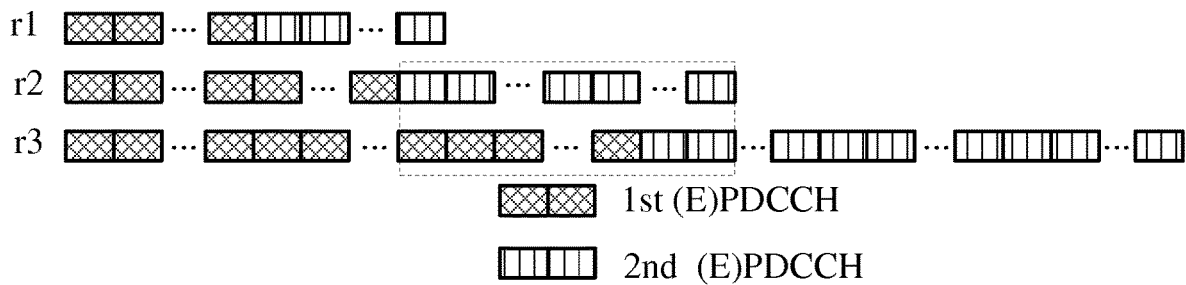
FIG. 1 illustrates an exemplary subframe allocation in a solution for transmitting (E)PDCCH repetitions.
FIG. 2 illustrates a wireless communication method at eNB side according to an embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

It is noted that although the embodiments of the present disclosure may be described in the context of MTC, the present disclosure can be applied to any communication which needs (E)PDCCH repetitions.

In order to satisfy multiple different coverage requirements, multiple repetition levels are supported while each of the repetition levels corresponds to an integral (E)PDCCH repetition number (the repetition level is thus also referred to as repetition number in the present disclosure). The (E)PDCCH repetitions transmit signals carrying one DCI (Downlink control information). Each of the repetitions is transmitted in one subframe, and thus hundreds of (E)PDCCH repetitions would be transmitted in hundreds of concentrated subframes. MTC UEs or normal UEs in MTC mode need to receive the MTC (E)PDCCH repetitions and combine them to get the content of the transmitted DCI. When receiving, coherent combining of (E)PDCCH repetitions is not possible if the starting subframe of (E)PDCCH repetitions is not known by UEs. Blind detection of the starting subframe is very complicated for MTC UEs and increases the receiving cost, which is against MTC's low cost requirement.

One solution for the above issue is to signal the starting subframe of (E)PDCCH to the UE in order for the UE to know the starting subframe and detect the (E)PDCCH correctly. This solution needs additional signaling and the signaling should be received before the (E)PDCCH receiving. A precondition of correct decoding of (E)PDCCH is correct receiving of the signaling. This double-step (E)PDCCH transmission scheme may impact the robustness of (E)PDCCH transmission.

Another solution is that the starting subframes of (E)PDCCH are in a set of starting subframes (also referred to as a starting subframe set). The subframe indexes of the starting subframes in the starting subframe set satisfy mod $(n_{subframe}, r)=0$, where $n_{subframe}$ is the subframe index, and r is the repetition number of (E)PDCCH. In the present disclosure, the "subframe index" is the subframe index within one SFN (System Frame Number) period which is 10240 ms. By using this solution, the starting subframe set of each repetition level includes the subframes whose indices are integral multiple of the repetition number. The repetition number of each repetition level mostly depends on the coverage enhancement performance. However, this solution may result in high resource blocking probability. FIG. 1 illustrates an exemplary subframe allocation in this solution in which three repetition levels (repetition numbers r1, r2 and r3) are shown to transmit two (E)PDCCHs (1st (E)PDCCH and 2nd (E)PDCCH). As shown in FIG. 1, if one (E)PDCCH with repetition number r2 is transmitted in the position of the 2nd (E)PDCCH as shown in a dashed block, the positions of both the 1st and the 2nd (E)PDCCH with repetition number r3 may be blocked as shown in the dashed block and cannot be scheduled to any other (E)PDCCH.

In order to reduce the resource blocking probability, the present disclosure provides improved solutions which are described through embodiments in the following.

First Embodiment

In the first embodiment, there is provided a wireless communication method 200 as shown in FIG. 2 performed by an eNode B for transmitting PDCCH or EPDCCH. The method is preferably applied to MTC, but it can also be applied to any communication which needs (E)PDCCH repetitions. The method comprises a step 201 of transmitting multiple PDCCH or EPDCCH repetitions respectively in multiple successive downlink subframes with a transmission repetition number and a transmission starting subframe.

Here, the term of "successive downlink subframes" means there is no other downlink subframes between two successive downlink subframes in time domain but there could be uplink subframes between them. For example, for FDD (Frequency Division Duplexing), all the 10 subframes in one frame can be used for downlink, and thus the successive downlink subframes are equivalent to successive subframes. For TDD (Time division Duplexing), according to 3GPP RAN1 36.211 standard, there are 10 subframes in one frame. Some of them are uplink subframes to transmit uplink signals, and some of them are downlink subframes to transmit downlink signals which are configured by the following table 1 (From 3GPP RAN1 36.211).

TABLE 1

| Uplink-downlink configurations | | | | | | | | | | | |
|---|---|---|---|---|---|---|---|---|---|---|---|
| Uplink-downlink config-uration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For Table 1, if there is no downlink subframe between two downlink subframes even though there is an uplink subframe between them, the two downlink subframes can be referred to as "successive downlink subframes". For example, if configuration 0 is adopted from Table 1 and subframe number 1 ("S" subframe) is not configured for downlink PDCCH or EPDCCH transmission, subframe number 0 and subframe number 5 are successive downlink subframes. However, if the "5" subframe of subframe number 1 in configuration 0 is configured for downlink, subframe number 0 and subframe number 5 would not be considered as successive downlink subframes since there is a downlink subframe number 1.

In the method according to the first embodiment, the transmission repetition number is selected from a repetition number set which is composed of at least a first repetition number and a second repetition number larger than the first repetition number. Therefore, at least two repetition levels each corresponding to a different repetition number can be selected as the transmission repetition number to transmit the (E)PDCCH repetitions. The repetition number or the transmission repetition number means how many times one (E)PDCCH would be transmitted repeatedly in successive downlink subframes.

According to the first embodiment, the transmission starting subframe can be selected from a first starting subframe set corresponding to the first repetition number when the first repetition number is selected as the transmission repetition number, and the transmission starting subframe can be selected from a second starting subframe set corresponding to the second repetition number when the second repetition number is selected as the transmission repetition number. Here, for each repetition number (or repetition level), there is a corresponding starting subframe set, and when a certain repetition number is selected, the transmission starting subframe from which the transmission of the multiple (E)PDCCH repetitions starts should be selected from a starting subframe set corresponding to the selected certain repetition number. Accordingly, at the UE side, the UE can only need to detect the subframes in the starting subframe set to find the transmission starting subframe, and therefore, the detection complexity at UE side can be reduced.

According to the first embodiment, the subframe indexes of any two adjacent starting subframes in the first starting subframe set are offset by a same first index interval, the subframe indexes of any two adjacent starting subframes in the second starting subframe set are offset by a same second index interval, the second index interval is an integral multiple of the first index interval, the subframe index of at least one subframe in the first starting subframe set is identical to the subframe index of one subframe in the second starting subframe set, the number of downlink subframes from any starting subframe until its next starting subframe in the first starting subframe set is not smaller than the first repetition number, and the number of downlink subframes from any starting subframe until its next starting subframe in the second starting subframe set is not smaller than the second repetition number.

Figure 3:
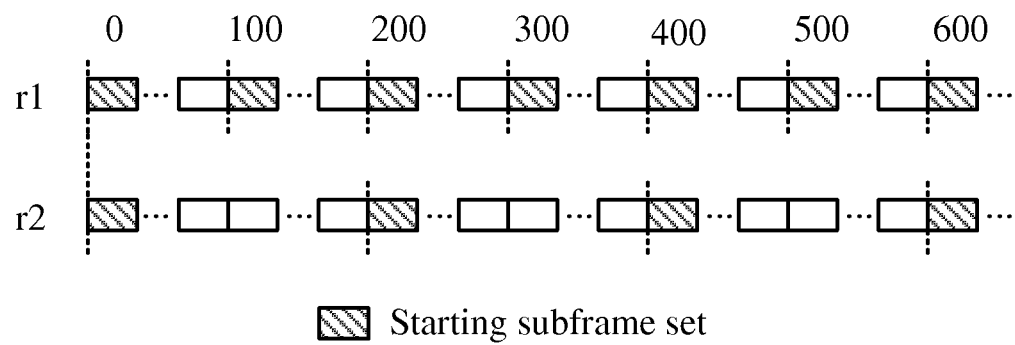
FIG. 3 illustrates an exemplary subframe allocation for transmitting (E)PDCCH repetitions according to an embodiment of the present disclosure.

As described in the above, in the present disclosure, the "subframe index" is the subframe index within one SFN period. In each of the first and second starting subframe sets, the starting subframe candidates are distributed uniformly, that is, the index difference between two adjacent candidates is the same across the starting subframe set. For example, as shown in FIG. 3, the subframe indexes of subframes in the first starting subframe set corresponding to the first repetition number r1 can be 0, 100, 200, 300, 400, 500, 600, . . . , and the subframe indexes of subframes in the second starting subframe set corresponding to the second repetition number r2 can be 0, 200, 400, 600, . . . . Further, the second index interval is an integral multiple of the first index interval. As shown in the example of FIG. 3, the first index interval r1 is 100, the second index interval r2 is 200, and thus the second index interval is the double of the first index interval. In addition, in order to make the first starting subframe set aligned with the second starting subframe set, the subframe index of at least one subframe in the first starting subframe set should be identical to the subframe index of one subframe in the second starting subframe set. As shown in the example of FIG. 3, at least the subframe indexes "0", "200", "400" and "600" exist both in the first starting subframe and in the second starting subframe. Moreover, the number of downlink subframes from any starting subframe until its next starting subframe in the first or second starting subframe set should not be smaller than the first or second repetition number in order that the multiple (E)PDCCH repetitions allocated in multiple successive downlink subframes beginning from one starting subframe will not overlap its next starting subframe. In particular, for FDD, the number of downlink subframes from any starting subframe until its next starting subframe is equal to the corresponding index interval since all the subframes in FDD can be used for downlink. However, for TDD, the number of downlink subframes from any starting subframe until its next starting subframe is smaller than the corresponding index interval since some subframes in TDD need to be used for uplink and those uplink subframes should be excluded when counting the number of downlink subframes. It is noted that when counting the number of downlink subframes from a certain starting subframe until its next starting subframe, the certain starting subframe is included while its next starting subframe is not included. For example, in FIG. 3, when counting the number of downlink subframes from the subframe with index "0" until the subframe with index "100" in the first starting subframe set (the top line), the subframe with index "0" is included while the subframe with index "100" is excluded.

When the first starting subframe set and the second starting subframe set are constructed as the above according to the first embodiment, one (E)PDCCH with smaller repetition number (the first repetition number herein) would only block one (E)PDCCH position with larger repetition number (the second repetition number herein) since the index interval of starting subframes corresponding to the larger repetition number is an integral multiple of that corresponding to the smaller repetition number and the starting subframe candidates corresponding to the two repetition numbers are aligned with each other. As shown in FIG. 3, any (E)PDCCH with repetition number r1 would only occupy one (E)PDCCH position with repetition number r2. As a result, according to the first embodiment, the resource blocking probability can be decreased.

It is noted that there can be more than two repetition numbers and corresponding starting subframe sets according to the present disclosure. In this case, at least two starting subframe sets among all the starting subframe sets should satisfy the definitions according to the present disclosure. Preferably, any two starting subframe sets among all the starting subframe sets satisfy the definitions. This applies to all the embodiments of the present disclosure.

According to the first embodiment, as an example, a mathematical expression (1) can be used to construct the first and/or second starting subframe sets as follows:

$$\mod(n_{subframe}, P) = 0 \quad (1),$$

where $n_{subframe}$ is the subframe index as described in the above which is to be chosen as a starting subframe candidate in the first or second starting subframe set, and P is the index interval between two adjacent subframes in the first or second starting subframe set. P can be any positive integer satisfying that the number of downlink subframes from any starting subframe until its next starting subframe in the starting subframe set is not smaller than its corresponding repetition number r. In particular, for FDD, the above condition can be expressed as P≥r. In addition, If $P_1$ and $P_2$ respectively represent P for the first and second starting subframe sets, then $P_2$ should be an integral multiple of $P_1$. For a repetition number r, the subframes corresponding to the subframe indexes $n_{subframe}$ satisfying the above expression (1) constitute the starting subframe set corresponding to the repetition number r.

As two preferable examples, P can be $k*\alpha$, and expression (1) becomes $\mod(n_{subframe}, k*\alpha) = 0$ (2); or P can be $\alpha^k$, and expression (1) becomes $\mod(n_{subframe}, \alpha^k) = 0$ (3), where $\alpha$ is any positive integer larger than 1 and common for different repetition levels under consideration, k is a repetition-level-specific parameter which is a positive integer satisfying that the number of downlink subframes from any starting subframe until its next starting subframe in the starting subframe set is not smaller than the corresponding repetition number r, in particular, satisfying $k*\alpha \geq r$ or $\alpha^k \geq r$ for FDD. The above expression (3) is particularly advantageous because for all available repetition numbers, the index interval of starting subframes corresponding to a certain repetition number is an integral multiple of that corresponding to any repetition number smaller than the certain repetition number.

For example, in the above expressions, $n_{subframe}$ can be expressed as $n_{subframe} = 10*n_{SFN} + \lfloor n_s/2 \rfloor$, where $n_s$ is the slot index within one radio frame, $n_{SFN}$ is the frame index within one SFN period.

As a specific example, for the above expression (2), $\alpha$ can be 5. This example is particularly advantageous for TDD. As seen from the above Table 1, for all the TDD uplink-downlink configurations, the subframe number 0 and number 5 are always downlink subframes that can be used to transmit (E)PDCCH. Thus, by using this example, the calculated starting subframes are always downlink subframes.

In the present disclosure, the repetition number set, the first index interval, the second index interval, the first starting subframe set and/or the second starting subframe set can be fixedly specified; or the information on the repetition number set, the first index interval, the second index interval, the first starting subframe set and/or the second starting subframe set can be configured through high-layer signaling (e.g. RRC signaling or MAC signaling). When UE gets informed of all or some of the above information, it can detect subframes only in the first or second starting subframe set to find the transmission starting subframe. In addition, the transmission repetition number may be signaled through physical-layer or high-layer signaling.

Further, in the subframes in which a UE is not required to receive (E)PDCCH by the proposed solution according to the present disclosure, the UE can preferably enters DRX (Discontinuous Receive) for battery saving. This can also be applied to the other embodiments.

Figure 4:
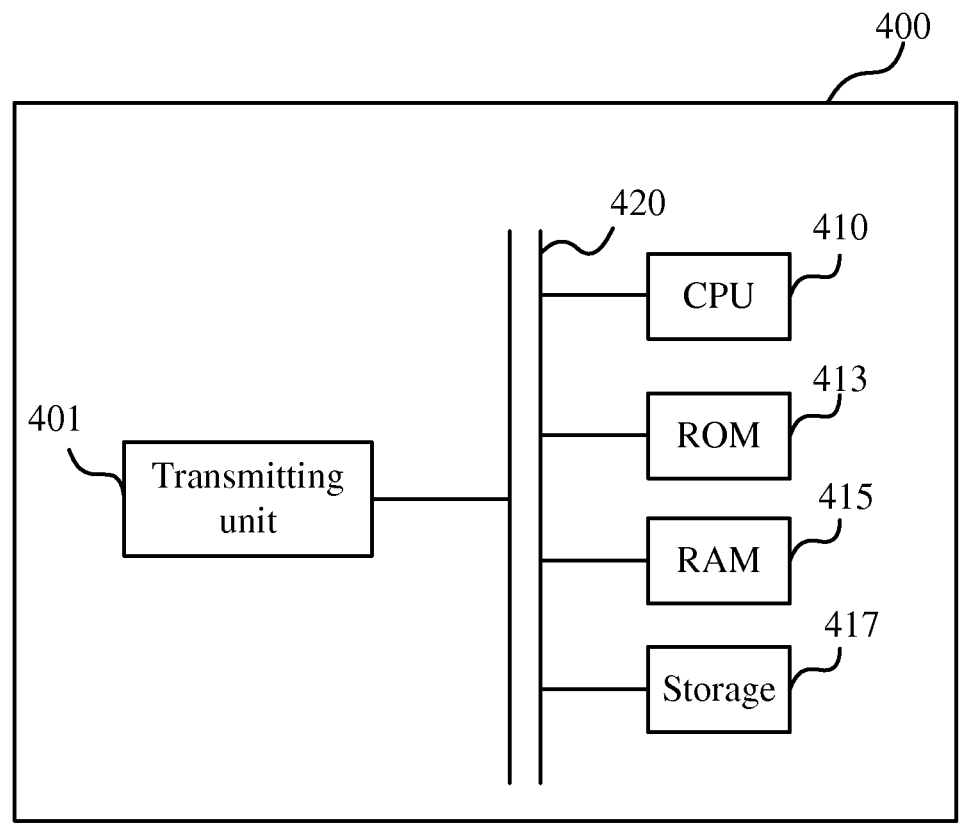
FIG. 4 is a block diagram illustrating an eNB according to an embodiment of the present disclosure.

In the first embodiment, an eNB for performing the above method is also provided. FIG. 4 is a block diagram illustrating an eNB 400 for transmitting PDCCH or EPDCCH according to an embodiment of the present disclosure. The eNB 400 comprises a transmitting unit 401 configured to transmit multiple PDCCH or EPDCCH repetitions respectively in multiple successive downlink subframes with a transmission repetition number and a transmission starting subframe, wherein the transmission repetition number is selected from a repetition number set which is composed of at least a first repetition number and a second repetition number larger than the first repetition number, the transmission starting subframe is selected from a first starting subframe set corresponding to the first repetition number when the first repetition number is selected as the transmission repetition number, and the transmission starting subframe is selected from a second starting subframe set corresponding to the second repetition number when the second repetition number is selected as the transmission repetition number, and the subframe indexes of any two adjacent starting subframes in the first starting subframe set are offset by a same first index interval, the subframe indexes of any two adjacent starting subframes in the second starting subframe set are offset by a same second index interval, the second index interval is an integral multiple of the first index interval, the subframe index of at least one subframe in the first starting subframe set is identical to the subframe index of one subframe in the second starting subframe set, the number of downlink subframes from any starting subframe until its next starting subframe in the first starting subframe set is not smaller than the first repetition number, and the number of downlink subframes from any starting subframe until its next starting subframe in the second starting subframe set is not smaller than the second repetition number.

The eNB 400 according to the present disclosure may optionally include a CPU (Central Processing Unit) 410 for executing related programs to process various data and control operations of respective units in the eNB 400, a ROM (Read Only Memory) 413 for storing various programs required for performing various process and control by the CPU 410, a RAM (Random Access Memory) 415 for storing intermediate data temporarily produced in the procedure of process and control by the CPU 410, and/or a storage unit 417 for storing various programs, data and so on. The above transmitting unit 401, CPU 410, ROM 413, RAM 415 and/or storage unit 417 etc. may be interconnected via data and/or command bus 420 and transfer signals between one another.

Respective units as described above do not limit the scope of the present disclosure. According to one implementation of the disclosure, the functions of the above transmitting unit 401 may be implemented by hardware, and the above CPU 410, ROM 413, RAM 415 and/or storage unit 417 may not be necessary. Alternatively, the functions of the above transmitting unit 401 may also be implemented by functional software in combination with the above CPU 410, ROM 413, RAM 415 and/or storage unit 417 etc.

Figures 5, 6:
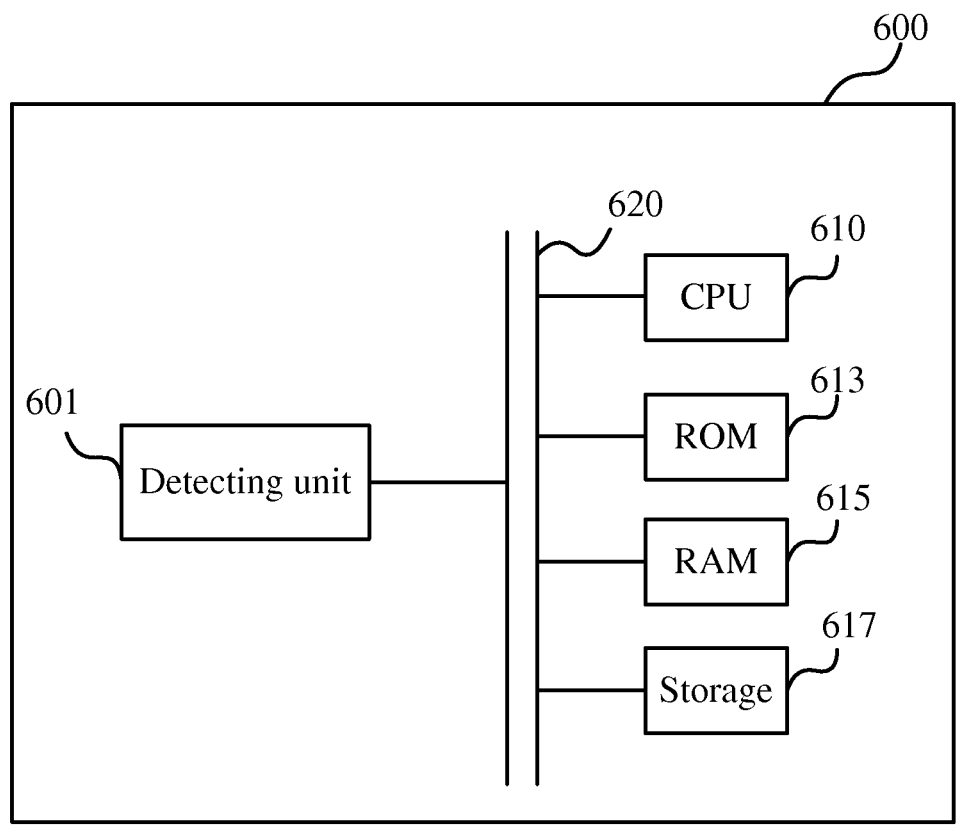
FIG. 5 illustrates a wireless communication method at UE side according to an embodiment of the present disclosure.
FIG. 6 is a block diagram illustrating a UE according to an embodiment of the present disclosure.

Accordingly, at UE side, the first embodiment can be implemented as a wireless communication method 500 performed by the UE for detecting PDCCH or EPDCCH transmitted from an eNode B as shown in FIG. 5. The wireless communication method 500 comprises a step 501 of detecting multiple PDCCH or EPDCCH repetitions transmitted respectively in multiple successive downlink subframes from the eNode B with a transmission repetition number and a transmission starting subframe, wherein the transmission repetition number is selected from a repetition number set which is composed of at least a first repetition number and a second repetition number larger than the first repetition number, the transmission starting subframe is selected from a first starting subframe set corresponding to the first repetition number when the first repetition number is selected as the transmission repetition number, and the transmission starting subframe is selected from a second starting subframe set corresponding to the second repetition number when the second repetition number is selected as the transmission repetition number, and the subframe indexes of any two adjacent starting subframes in the first starting subframe set are offset by a same first index interval, the subframe indexes of any two adjacent starting subframes in the second starting subframe set are offset by a same second index interval, the second index interval is an integral multiple of the first index interval, the subframe index of at least one subframe in the first starting subframe set is identical to the subframe index of one subframe in the second starting subframe set, the number of downlink subframes from any starting subframe until its next starting subframe in the first starting subframe set is not smaller than the first repetition number, and the number of downlink subframes from any starting subframe until its next starting subframe in the second starting subframe set is not smaller than the second repetition number.

In addition, in the first embodiment, a UE for performing the above method at UE side is also provided. FIG. 6 is a block diagram illustrating a UE 600 for detecting PDCCH or EPDCCH transmitted from an eNode B according to an embodiment of the present disclosure. The UE 600 comprises a detecting unit 601 configured to detect multiple PDCCH or EPDCCH repetitions transmitted respectively in multiple successive downlink subframes from the eNode B with a transmission repetition number and a transmission starting subframe, wherein the transmission repetition number is selected from a repetition number set which is composed of at least a first repetition number and a second repetition number larger than the first repetition number, the transmission starting subframe is selected from a first starting subframe set corresponding to the first repetition number when the first repetition number is selected as the transmission repetition number, and the transmission starting subframe is selected from a second starting subframe set corresponding to the second repetition number when the second repetition number is selected as the transmission repetition number, and the subframe indexes of any two adjacent starting subframes in the first starting subframe set are offset by a same first index interval, the subframe indexes of any two adjacent starting subframes in the second starting subframe set are offset by a same second index interval, the second index interval is an integral multiple of the first index interval, the subframe index of at least one subframe in the first starting subframe set is identical to the subframe index of one subframe in the second starting subframe set, the number of downlink subframes from any starting subframe until its next starting subframe in the first starting subframe set is not smaller than the first repetition number, and the number of downlink subframes from any starting subframe until its next starting subframe in the second starting subframe set is not smaller than the second repetition number.

The UE 600 according to the present disclosure may optionally include a CPU (Central Processing Unit) 610 for executing related programs to process various data and control operations of respective units in the UE 600, a ROM (Read Only Memory) 613 for storing various programs required for performing various process and control by the CPU 610, a RAM (Random Access Memory) 615 for storing intermediate data temporarily produced in the procedure of process and control by the CPU 610, and/or a storage unit 617 for storing various programs, data and so on. The above detecting unit 601, CPU 610, ROM 613, RAM 615 and/or storage unit 617 etc. may be interconnected via data and/or command bus 620 and transfer signals between one another.

Respective units as described above do not limit the scope of the present disclosure. According to one implementation of the disclosure, the functions of the above detecting unit 601 may be implemented by hardware, and the above CPU 610, ROM 613, RAM 615 and/or storage unit 617 may not be necessary. Alternatively, the functions of the above detecting unit 601 may also be implemented by functional software in combination with the above CPU 610, ROM 613, RAM 615 and/or storage unit 617 etc.

As described in the above, according to the first embodiment of the present invention, the resource blocking probability of different repetition numbers, UE's detection complexity, and eNB's scheduling complexity can be decreased.

Second Embodiment

The second embodiment of the present disclosure is further enhancement of the first embodiment, and all the descriptions for the first embodiment are also applied to the second embodiment unless the context indicates otherwise.

In the second embodiment, the first starting subframe set and/or the second starting subframe set can be each divided into a number of starting subframe subsets, and each of the starting subframe subsets is dedicated for transmitting the PDCCH or EPDCCH repetitions to one specific UE set composed of one or more UEs. From eNB's perspective, the starting subframe set for all UEs can be determined according to the first embodiment, for example, by expression (1). However, for different UE sets, different starting subframe candidates can be chosen from the starting subframe set to form respective starting subframe subsets each of which is dedicated for one UE set.

Figure 7:
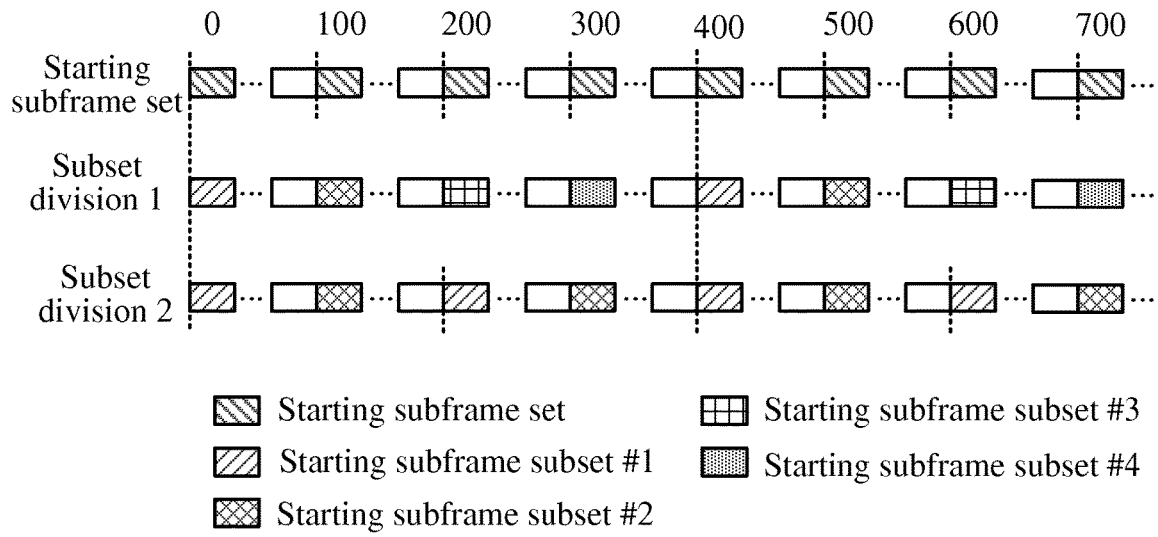
FIG. 7 illustrates an exemplary subframe allocation for transmitting (E)PDCCH repetitions according to another embodiment of the present disclosure.

In such a way, blind detection number of each UE decreases since it only needs to detect the starting subframe candidates in the stating subframe subset dedicated for itself. As shown in FIG. 7 which illustrates an exemplary subframe allocation for transmitting (E)PDCCH repetitions, the top line is the starting subframe set for all UEs in which the starting subframe candidates are subframes with indexes 0, 100, 200, 300, 400, 500, 600, 700, . . . , and the middle and bottom lines show two subset dividing manners (subset division 1 and subset division 2). In the middle line, the starting subframe set is divided into four subsets each of which is dedicated for one UE set. As exemplarily shown in FIG. 7, the subframes with indexes 0, 400, . . . constitute the starting subframe subset #1, the subframes with indexes 100, 500, . . . constitute the starting subframe subset #2, the subframes with indexes 200, 600, . . . constitute the starting subframe subset #3, and the subframes with indexes 300, 700, . . . constitute the starting subframe subset #4. In the bottom line, the starting subframe set is divided into two subsets. The subframes with indexes 0, 200, 400, 600, . . . constitute the starting subframe subset #1, the subframes with indexes 100, 300, 500, 700, . . . constitute the starting subframe subset #2.

Preferably, for at least one of the first and second starting subframe sets, the starting subframe subset can be constructed by adopting one subframe every predetermined number of subframes from the first starting subframe set or the second starting subframe set. For example, in the middle line of FIG. 7, the starting subframe subset is constructed by adopting one subframe every 4 subframes from the starting subframe set, and in the bottom line of FIG. 7, the starting subframe subset is constructed by adopting one subframe every 2 subframes from the starting subframe set. However, it is noted that the construction of the starting subframe is not limited to the above manner, and it can use any suitable manner. For example, a number of successive starting subframe candidates in the starting subframe set can be adopted for one subset, and a number of following successive starting subframe candidates can be adopted for another subset. For example, for the starting subframe set shown in the top line of FIG. 7, the subframes with indexes 0, 100, 200 and 300 can be taken into one starting subframe subset, and the subframes with indexes 400, 500, 600 and 700 can be taken into another starting subframe subset. The present disclosure is not limited by any specific division manner of the starting subframe subsets.

In addition, preferably, the UE sets respectively corresponding to the starting subframe subsets can be determined by UE IDs of the UEs or configured through signaling such as physical-layer or high-layer signaling (e.g. RRC or MAC signaling). Here, UE ID refers to any identifier for identifying a UE, which is preferably but not limited to UE specific RNTI (Radio Network Temporary Identifier).

As an example of determining the UE sets respectively corresponding to the starting subframe subsets by UE IDs, the following expression (4) can be employed:

$$\mathrm{mod}(n_{subframe} - P * \mathrm{mod}(n_{RNTI}, N_s), N_s * P) = 0, \qquad (4)$$

where $n_{RNTI}$ is UE-specific RNTI for a UE, $N_s$ is the number of the UE sets or the starting subframe subsets for one starting subframe set, and $n_{subframe}$ and P share the same meaning as in expression (1).

According to expression (4), given the $n_{RNTI}$ of a certain UE, the subframe index $n_{subframe}$ of the starting subframe candidates for the certain UE can be determined. The determined starting subframe candidates for the certain UE constitute the starting subframe subset dedicated for the UE set to which the certain UE belongs, and the other UEs in the UE set are those for which the $\mathrm{mod}(n_{RNTI}, N_s)$ has the same result as that for the certain UE.

As an example of configuring the UE sets respectively corresponding to the starting subframe subsets through signaling, the following expression (5) can be employed:

$$\mathrm{mod}(n_{subframe} - X * P, N_s * P) = 0, \qquad (5)$$

where X represents the index of a UE set, X=0, 1, . . . , $N_s$−1 and x can be configured by high-layer signaling. Based on expression (5), for a certain UE set with index X, the subframe index of the starting subframe candidates can be determined, and the determined starting subframe candidates constitute the starting subframe subset for the certain UE set.

According to the second embodiment, the blind detection number of each UE decreases since it only needs to detect the starting subframe candidates in the stating subframe subset dedicated for itself.

Third Embodiment

The third embodiment of the present disclosure is further enhancement of the first or second embodiment in order to randomize the inter-cell interference, and all the descriptions for the first and second embodiments are also applied to the third embodiment unless the context indicates otherwise.

When the starting subframe sets or subsets for different cells are the same, the interference probability between different cells (in particular, neighboring cells) may be large if there is overlapping between the different cells since same subframes would probably always be used for transmitting (E)PDCCH to a same UE in the different cells. Therefore, in the third embodiment, the starting subframe set and/or subset is cell-specific, that is, the starting subframe set and/or subset changes from cell to cell, in order to randomize the inter-cell interference.

As a first example which is enhancement to the first or second embodiment, for the first and/or the second repetition number, the starting subframe set corresponding to a certain cell is different from the starting subframe set corresponding to another cell which is preferably a neighboring cell that would interfere with the certain cell. Here, two starting subframe sets are considered different if the subframe index of at least one subframes in one starting subframe set of the two sets is different from the subframe index of every subframe in the other starting subframe sets of the two sets.

Figure 8:
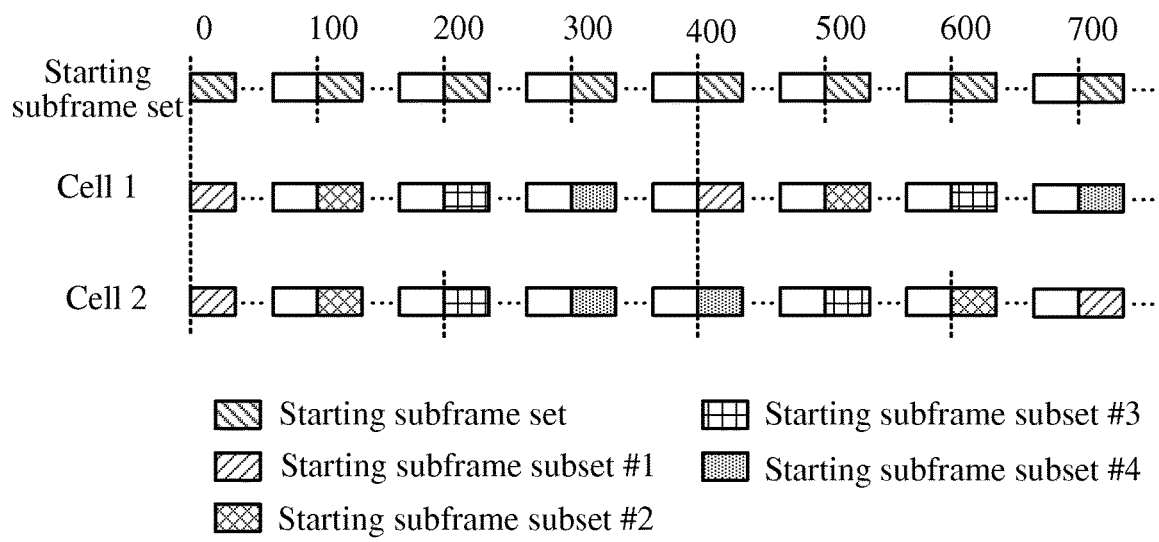
FIG. 8 illustrates an exemplary subframe allocation for transmitting (E)PDCCH repetitions according to yet another embodiment of the present disclosure.

As a second example which is enhancement to the second embodiment, for the first starting subframe set and/or the second starting subframe set, each of the starting subframe subsets corresponding to a certain cell is different from any of the starting subframe subsets corresponding to another cell which is preferably a neighboring cell that would interfere with the certain cell. Here, two starting subframe subsets are considered different if the subframe index of at least one subframes in one starting subframe subset of the two subsets is different from the subframe index of every subframe in the other starting subframe subsets of the two subsets. For example, FIG. 8 illustrates an exemplary subframe allocation for transmitting (E)PDCCH repetitions according to the third embodiment. The top line is the starting subframe set in which the starting subframe candidates are subframes with indexes 0, 100, 200, 300, 400, 500, 600, 700, . . . , assuming the two cells (cell1 and cell 2) under consideration have the same starting subframe set. The middle line shows the division of the starting subframe subsets for cell 1 and the bottom line shows the division of the starting subframe subsets for cell 2. As shown in the figure, for cell 1, the starting subframe subset #1 includes the subframes with indexes 0, 400, . . . , the starting subframe subset #2 includes the subframes with indexes 100, 500, . . . , the starting subframe subset #3 includes the subframes with indexes 200, 600, . . . , and the starting subframe subset #4 includes the subframes with indexes 300, 700, . . . , while for cell 2, the starting subframe subset #1 includes the subframes with indexes 0, 700, . . . , the starting subframe subset #2 includes the subframes with indexes 100, 600, . . . , the starting subframe subset #3 includes the subframes with indexes 200, 500, . . . , and the starting subframe subset #4 includes the subframes with indexes 300, 400, . . . . It is obvious that each of the starting subframe subsets for cell 1 is different any of the starting subsets for cell 2. According to this example, the subframes corresponding to one of the starting subframe subsets would not always the same for different cells, whereby the inter-cell interference is randomized and the inter-cell interference probability is reduced. For example, as shown in FIG. 8, for the starting subframe subset #1 corresponding to a set of UEs, at the subframe with index 0, cell 1 and cell 2 may interfere with each other; however, when coming to the next starting subframe, cell 1 and cell 2 may not interfere with each other since the next starting subframes for cell 1 and cell 2 are respectively the subframes with index 400 and 700 which are different.

It is noted that the above first and second examples of the third embodiment can be implemented individually or in combination.

Mathematically, the third embodiment can be expressed for example by expression (6) as follows:

$$\mod(n_{subframe}+f(n_{cell\_ID}),P)=0 \qquad (6),$$

where $n_{cell\_ID}$ is a cell index, and $f(n_{cell\_ID})$ represents a cell-specific offset and is function of $n_{cell\_ID}$. For example, $f(n_{cell\_ID})$ can be 0 for $n_{cell\_ID}=1$, and 10 for $n_{cell\_ID}=2$. The $f(n_{cell\_ID})$ can be configured according to practical applications. It can be seen that the starting subframe set obtained based on expression (6) is cell-specific.

In the case of the starting subframe set being divided into UE set-specific starting subframe subsets, the starting subframe subsets can be obtained by expression (7) or (8) as follows:

$$\mod(n_{subframe}-P*\mod(n_{RNTI}+f,N_s),N_s*P)=0 \qquad (7),$$

$$\mod(n_{subframe}-\mod(X+f,N_s)*P,N_s*P)=0 \qquad (8),$$

where f is a cell-specific offset, and preferably $$f = n_{cell\_ID} + \left\lfloor \frac{n_{subframe}}{N_s * P} \right\rfloor,$$

or f=Y, Y is determined by eNB and signaled to UE. The other parameters share the same meaning as in the previous expressions. It is seen from expression (7) or (8), the starting subframe subsets are not only UE set specific but also cell specific.

According to the third embodiment, the inter-cell interference is randomized, and the inter-cell interference probability is reduced.

Fourth Embodiment

In the first to third embodiments, it is described how to choose multiple subframes for multiple (E)PDCCH repetitions. In the fourth embodiment, how to map one (E)PDCCH repetition in one subframe will be described. It is noted that the fourth embodiment can be implemented independently or in combination with one of the first to third embodiments.

In each subframe, one (E)PDCCH repetition is transmitted. There can be a number of (E)CCE sets in one subframe, and in each of the (E)CCE sets, one (E)PDCCH repetition can be transmitted. Here, the (E)CCE set means a set of any one or more (E)CCEs. The (E)CCE set can refer to (E)CCE candidate defined in LTE 36.213, but it is not limited to this. One (E)CCE set will be used to transmit a (E)PDCCH for one UE. Thus, the (E)CCE set determination for one (E)PDCCH repetition of one UE is UE-specific.

For example, the number of (E)CCE sets M can be determined by the following expressions (9) or (10)

$$M = \left\lfloor \frac{N_{CCE} - 16}{L} \right\rfloor \text{ for } PDCCH, \qquad (9)$$

$$M = \left\lfloor \frac{N_{CCE}}{L} \right\rfloor \text{ for } EPDCCH, \qquad (10)$$

where $N_{CCE}$ is the total number of available (E)CCEs in the control region, L is the aggregation level of the (E)PDCCH repetition. For PDCCH, 16 CCEs should be preserved for common search space.

Figure 9:
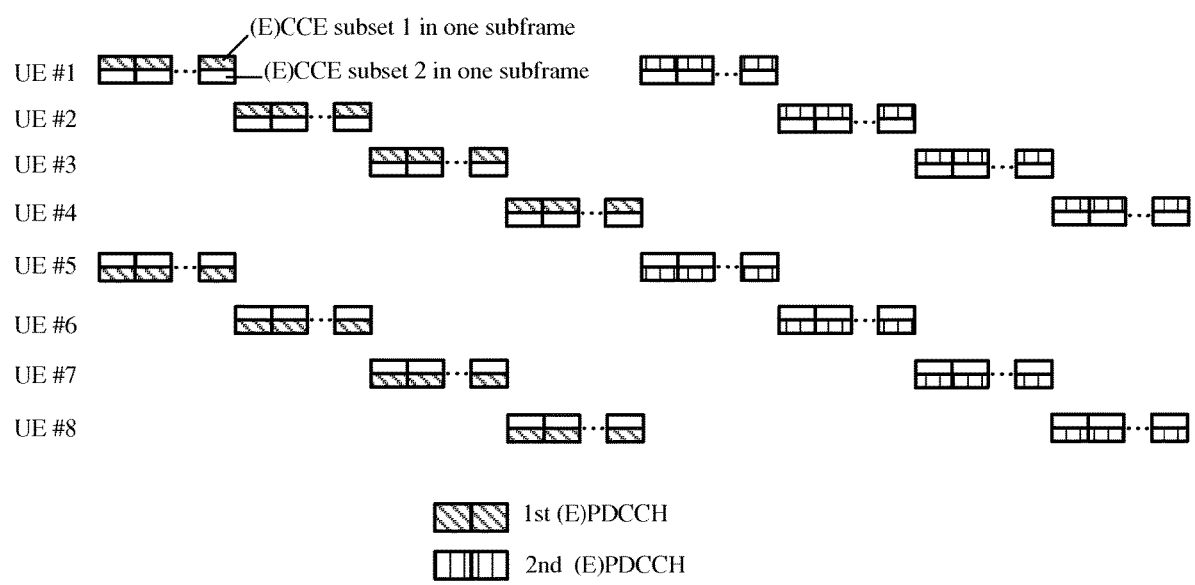
FIG. 9 illustrates an exemplary allocation of subframes and their (E)CCE sets for different UEs according to an embodiment of the present disclosure.

FIG. 9 illustrates an example of the allocation of the subframes and their (E)CCE sets for different UEs. Here, in one subframe, only two (E)CCE sets are exemplarily shown for transmitting (E)PDCCH. One (E)CCE set for transmitting (E)PDCCH can be corresponding to one UE. As shown in FIG. 9, for example, UE #1 and UE #5 occupy the same subframes, but they can be assigned with different (E)CCE sets ((E)CCE set 1 or (E)CCE set 2) to transmit (E)PDCCH; therefore, blocking can be avoided or reduced.

Preferably, the (E)CCE set for transmitting one PDCCH or EPDCCH repetition to a UE in one subframe can be determined by a UE ID (e.g., UE-specific RNTI) of the UE or configured through high-layer signaling.

For example, the (E)CCE set for a UE can be determined by the following expression (11):

$$m=\mathrm{mod}(n_{RNTI}, M) \quad (11),$$

where m is the index of the (E)CCE set for the UE which has a UE-specific RNTI of $n_{RNTI}$, and M is the number of (E)CCE sets in one subframe.

As another example, the information of index m of the (E)CCE set for transmitting (E)PDCCH to a certain UE can be configured by high-layer signaling, wherein m=0, 1, . . . , M−1.

In above examples of the fourth embodiment, the indexes of the (E)CCE sets used for (E)PDCCH repetitions in one (E)PDCCH repetition period can be same or different, wherein one repetition period includes r repetitions carrying one DCI for the repetition level with the repetition number r.

As yet another example, the indexes of the (E)CCE sets used for (E)PDCCH repetitions in one (E)PDCCH repetition period are same for one UE, while the indexes of the (E)CCE sets used for (E)PDCCH repetitions in different (E)PDCCH repetition periods for one UE are different. This method is used to randomize the resource blocking between UEs. For example, according to the above method, when the indexes of (E)CCE sets for (E)PDCCHs to UE #1 and UE #2 are same in repetition period #1, the indexes of (E)CCE sets for (E)PDCCHs to UE #1 and UE #2 in repetition period #2 can be different, which decreases the resource blocking situation.

Preferably, the (E)CCE set for transmitting (E)PDCCH to one certain UE can be determined by the index of the subframe or the index of the frame. For example, the indexes of CCEs corresponding to MTC PDCCH $S_q^{(L)}$ are given by $$L\{(Y_q+t) \bmod \lfloor (N_{CCE}-16)/L \rfloor\}+i+16 \quad (12),$$

where L is the aggregation level, i=0, . . . , L−1, t is a positive integer number and no more than 6, $N_{CCE}$ is the total number of CCEs in the control region, and the variable $Y_q$ is defined by $$Y_q=(A \cdot Y_{q-1}) \bmod D \quad (13),$$

where $Y_{-1}=n_{RNTI} \neq 0$, A=39827, D=65537 and $n_{RNTI}$ is a UE-specific parameter.

q is determined by one of the following methods:
q=SFN, where SFN is the frame number of the starting subframe, or $$q = \left\lfloor \frac{n_{subframe}}{r} \right\rfloor,$$

where $n_{subframe}$ is the subframe index within one SFN period, and r is the repetition number.

According to the fourth embodiment, the (E)CCE set for transmitting one (E)PDCCH repetition in one subframe is determined in a UE-specific manner.

Fifth Embodiment

The fifth embodiment of the present disclosure is further enhancement of the second or third embodiment in order to further reduce the blocking probability and increase the resource usage, and all the descriptions for the first to third embodiments are also applied to the fifth embodiment unless the context indicates otherwise.

In the second embodiment, the starting subframes of (E)PDCCH can be restricted in a subset of starting subframes in a UE-specific manner. In the fifth embodiment, in each subframe, the (E)PDCCH is transmitted in a (E)CCE set which is also selected in a UE-specific manner. The determination of the starting subframe subset and the (E)CCE set are based on at least one common parameter.

In the fifth embodiment, preferably, the UEs receiving the PDCCH or EPDCCH repetition in the CCE or ECCE sets with the same index in different subframes include UEs from all the UE sets respectively corresponding to the starting subframe subsets. The following Table 2 illustrates a specific example. For example, it can be seen from Table 2 that UEs #4, #5, #6 and #7 share the same (E)CCE set index which is 2 and they include UEs from all the UE sets respectively corresponding to the starting subframe subsets with indexes 1-4 since UE #4 is corresponding to the starting subframe subset with index 1, UE #5 is corresponding to the starting subframe subset with index 2, UE #6 is corresponding to the starting subframe subset with index 3, and UE #7 is corresponding to the starting subframe subset with index 4. In this way, the UEs which are assigned with the same (E)CCE set index can be assigned in different starting subframe subsets, and the UEs which are assigned in the same starting subframe subset can be assigned with different (E)CCE set indexes. As shown in Table 2, UEs #4, #5, #6 and #7 which are assigned with the same (E)CCE set index 2 are assigned in different starting subframe subsets with index of 1, 2, 3 and 4 respectively, while UEs #1, #5, #9, #13, . . . which are in the same subframe subset with index 2 are assigned with different (E)CCE set indexes 1, 2, 3, 4, . . . . . Therefore, according to the fifth embodiment, the resource blocking probability would decrease a lot, and it is also easier for eNB to schedule (E)PDCCH repetition transmission.

TABLE 2

| | | Starting subframe subset index | | | | | | | |
|---|---|---|---|---|---|---|---|---|---|
| UE index | | 1 | 2 | 3 | 4 | 1 | 2 | 3 | 4 | 1 |
| (E)CCE set index | 1 | 0 | 1 | 2 | 3 | 72 | 73 | 74 | 75 | ... |
| | 2 | 4 | 5 | 6 | 7 | 76 | 77 | 78 | 79 | ... |
| | 3 | 8 | 9 | 10 | 11 | 80 | 81 | 82 | 83 | ... |
| | 4 | 12 | 13 | 14 | 15 | 84 | 85 | 86 | 87 | ... |
| | 5 | 16 | 17 | 18 | 19 | 88 | 89 | 90 | 91 | ... |
| | 6 | 20 | 21 | 22 | 23 | 92 | 93 | 94 | 95 | ... |
| | 7 | 24 | 25 | 26 | 27 | 96 | 97 | 98 | 99 | ... |
| | 8 | 28 | 29 | 30 | 31 | 100 | 101 | 102 | 103 | ... |
| | 9 | 32 | 33 | 34 | 35 | 104 | 105 | 106 | 107 | ... |
| | 10 | 36 | 37 | 38 | 39 | 108 | 109 | 110 | 111 | ... |
| | 11 | 40 | 41 | 42 | 43 | 112 | 113 | 114 | 115 | ... |
| | 12 | 44 | 45 | 46 | 47 | 116 | 117 | 118 | 119 | ... |
| | 13 | 48 | 49 | 50 | 51 | 120 | 121 | 122 | 123 | ... |
| | 14 | 52 | 53 | 54 | 55 | 124 | 125 | 126 | 127 | ... |
| | 15 | 56 | 57 | 58 | 59 | 128 | 129 | 130 | 131 | ... |
| | 16 | 60 | 61 | 62 | 63 | 132 | 133 | 134 | 135 | ... |
| | 17 | 64 | 65 | 66 | 67 | 136 | 137 | 138 | 139 | ... |
| | 18 | 68 | 69 | 70 | 71 | 140 | 141 | 142 | 143 | ... |

According to the fifth embodiment, the method of determining the starting subframe subset and the (E)CCE set for a UE can be mathematically expressed by the following examples.

In a first example, the starting subframe subset can be determined by expression (4) as described in the second embodiment, and the index of the (E)CCE set in one subframe can be determined by:

$$m=\mathrm{mod}(\lfloor n_{RNTI}/N_s \rfloor, M) \quad (14),$$

where m is the index of the (E)CCE set for the UE which has a UE-specific RNTI of $n_{RNTI}$, M is the number of (E)CCE sets in one subframe, and $N_s$ is the number of the UE sets or the starting subframe subsets for one starting subframe set.

In a second example, the starting subframe subset can be determined by expression (5) as described in the second embodiment, and the index of the (E)CCE set in one subframe can be determined by expression (14).

According to the fifth embodiment, the resource blocking probability would decrease a lot, and it can also be easier for eNB to schedule (E)PDCCH repetition transmission.

It is noted that the above embodiments can be implemented individually or in combination unless the context indicates otherwise.

The present invention can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present invention intends to be variously changed or modified by those skilled in the art based on the description presented in the specification and known technologies without departing from the content and the scope of the present invention, and such changes and applications fall within the scope that claimed to be protected. Furthermore, in a range not departing from the content of the invention, the constituent elements of the above-described embodiments may be arbitrarily combined.

What is claimed is:

1. A communication device comprising:
control circuitry which, in operation, sets a repetition level corresponding to a number of one or more repetitions of a physical downlink control channel; and
transmission circuitry which, in operation, transmits, to a user equipment (UE), the one or more repetitions of the physical downlink control channel in one or more subframes starting from a starting subframe with the set repetition level, wherein,
the set repetition level is one of multiple repetition levels including a first repetition level and a second repetition level that is larger than the first repetition level,
the starting subframe is one of a subset of subframes, and the subset of subframes is configured to be specific to the UE and comprised of every n-th subframe among a set of starting subframes defined for the set repetition level, where n is an integer greater than 1, and
at least one subframe of a first set of starting subframes defined for the first repetition level is the same as at least one subframe of a second set of starting subframes defined for the second repetition level, and a second interval between the second set of starting subframes is an integer multiple of a first interval between the first set of starting subframes.

2. The communication device according to claim 1, wherein one or more physical downlink control channels are repeatedly transmitted in the one or more subframes, respectively.

3. The communication device according to claim 1, wherein the one or more subframes are consecutive downlink subframes available for transmission of the physical downlink control channel.

4. The communication device according to claim 1, wherein an index of the starting subframe is an integer multiple of the repetition level.

5. The communication device according to claim 1, wherein the first interval is equal to or larger than the first repetition level, and the second interval is equal to or larger than the second repetition level.

6. The communication device according to claim 1, wherein any two adjacent starting subframes of a set of starting subframes have an equal interval between them.

7. The communication device according to claim 1, wherein the set of starting subframes are given by $$\mathrm{mod}(n_{subframe}, P)=0$$

where $n_{subframe}$ is the set of starting subframes, and P is an interval between the set of starting subframes.

8. The communication device according to claim 1, wherein the set of starting subframes are given by $$\mathrm{mod}(n_{subframe}, P)=0$$

where $n_{subframe}$ is the set of starting subframes represented by $10 n_{SFN} + \lfloor n_s/2 \rfloor$, $n_{SFN}$ is an index of subframe, $n_s$ is an index of slot, and P is an interval between the set of starting subframes.

9. The communication device according to claim 8, wherein P is equal to or larger than the repetition level.

10. The communication device according to claim 8, wherein $P=k*\alpha$, where $\alpha$ is an integer that is common to the multiple repetition levels, and $k*\alpha$ is equal to or larger than the repetition level.

11. The communication device according to claim 1, wherein
the physical downlink control channel is transmitted on a control channel element (CCE) that is determined based on an identifier of the UE or configured by higher layer signaling.

12. The communication device according to claim 1, wherein at least one of the multiple repetition levels, the first interval, the second interval, the first set of starting subframes and the second set of starting subframes is fixedly set.

13. The communication device according to claim 1, wherein at least one of the multiple repetition levels, the first interval, the second interval, the first set of starting subframes and the second set of starting subframes is configured by higher layer signaling.

14. A communication method comprising:
setting a repetition level corresponding to a number of one or more repetitions of a physical downlink control channel; and
transmitting, to a user equipment (UE), the one or more repetitions of the physical downlink control channel in one or more subframes starting from a starting subframe with the set repetition level, wherein,
the set repetition level is one of multiple repetition levels including a first repetition level and a second repetition level that is larger than the first repetition level,
the starting subframe is one of a subset of subframes, and the subset of subframes is configured to be specific to the UE and comprised of every n-th subframe among a set of starting subframes defined for the set repetition level, where n is an integer greater than 1, and
at least one subframe of a first set of starting subframes defined for the first repetition level is the same as at least one subframe of a second set of starting subframes defined for the second repetition level, and a second interval between the second set of starting subframes is an integer multiple of a first interval between the first set of starting subframes.

* * * * *